United States Patent [19]
Yamamoto et al.

[11] Patent Number: 4,894,427
[45] Date of Patent: Jan. 16, 1990

[54] AROMATIC POLYESTER-POLYORGANOSILOXANE BLOCK COPOLYMER

[75] Inventors: Naoki Yamamoto; Hiroshi Mori, both of Hiroshima; Akira Nakata, Otake; Misayo Suehiro, Hiroshima, all of Japan

[73] Assignee: Mitsubishi Rayon Co., Ltd., Tokyo, Japan

[21] Appl. No.: 250,859

[22] Filed: Sep. 29, 1988

[30] Foreign Application Priority Data

Sep. 30, 1987 [JP] Japan .................. 62-243561
Aug. 8, 1988 [JP] Japan .................. 63-196019

[51] Int. Cl.$^4$ .............................. C08G 77/04
[52] U.S. Cl. ..................... 528/26; 528/17; 528/21; 525/446
[58] Field of Search ............. 528/26, 17, 21; 525/446

[56] References Cited

U.S. PATENT DOCUMENTS

| | | | |
|---|---|---|---|
| 4,348,510 | 9/1982 | Keck et al. | 525/446 |
| 4,452,962 | 6/1984 | Ginnings et al. | 528/26 |
| 4,640,962 | 2/1987 | Ostrozynski et al. | 525/446 |
| 4,699,967 | 10/1987 | Eichenauer et al. | 528/26 |
| 4,769,417 | 9/1988 | Eichenauer et al. | 528/26 |

Primary Examiner—Melvyn I. Marquis
Attorney, Agent, or Firm—Oblon, Spivak, McClelland, Maier & Neustadt

[57] ABSTRACT

An aromatic polyester-polyorganosiloxane block copolymer comprising a polyester segment consisting essentially of:
(a) an aromatic polyester of an aromatic dicarboxylic acid, or mixtures thereof, and a dihydric phenol, a lower aliphatic diol, an alicyclic diol, or mixtures thereof,
(b) an aromatic polyester of an aromatic hydroxycarboxylic acid or mixtures thereof, or
(c) a copolymer of (a) and (b),
and a polyorganosiloxane segment having a recurring unit represented by the formula:

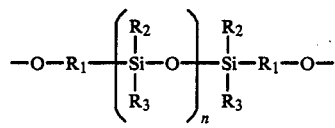

in which $R_1$ represents a lower alkylene group or a lower alkylene ether group; $R_2$ and $R_3$ independently represent a methyl group or a phenyl group; and n represents an integer not smaller than 10, in which bonding between the polyester segment and the polyorganosiloxane segment is an ester linkage formed by a condensation reaction between the terminal carboxyl group of the polyester segment and the terminal hydroxyl group of the polyorganosiloxane segment.

11 Claims, No Drawings

AROMATIC POLYESTER-POLYORGANOSILOXANE BLOCK COPOLYMER

INDUSTRIAL FIELD OF THE INVENTION

The present invention relates to an aromatic polyester-polyorganosiloxane block copolymer, and more particularly to an aromatic polyester-polyorganosiloxane block copolymer excellent in weather resistance, heat resistance, cold resistance, impact resistance and mold-ability and having high mechanical strengths.

DISCUSSION ON RELATED ART

Thermoplastic polyester resins constituted of polyethylene terephthalate, polybutylene terephthalate and the like are widely in use because of their excellent heat resistance and high mechanical strengths.

However, crystalline polyesters largely used today are inferior in impact resistance, though they have high mechanical strengths. Their impact strength is low particularly when an impact is applied to notched test piece, and therefore their impact strength is usually improved by compounding them with a reinforcing material such as glass fiber or the like. Further, polyethylene (or polybutylene)terephthalate-polyether block copolymer is used as an excellent thermoplastic elastomer, and in this copolymer the introduction of polyether segment is for the purpose of improving impact strength. However, polyether segment is inferior in weather resistance and cold resistance, so that said block copolymer is similarly inferior in these resistances. Thus, from the viewpoint of overcoming the above-mentioned disadvantages, a block copolymer containing polyorganosiloxane as a soft segment is watched with interest currently, because polyorganosiloxane is excellent in heat resistance and cold resistance.

For example, the aromatic polyester-polyorganosiloxane block copolymers disclosed in Japanese Patent Application Kokai (Laid-Open) No. 61-179,227; 30th National SAMPE Symposium March 19-21, 1985; Applied Polymer Symposium No. 22, 143-156 (1973); and Ind. Eng. Chem. Prod. Res. Develop., Vol. 12, No. 4, 1973 have Si—O—C bond at the bonding part between aromatic polyester segment and polyorganosiloxane segment.

However, this Si—O—C bond is readily hydrolyzable, so that the above-mentioned aromatic polyester-polyorganosiloxane block copolymers are inferior in hydrolysis resistance and weather resistance.

Further, the aromatic polyester-polyorganosiloxane block copolymers disclosed in 30th National SAMPE Symposium March 19-21, 1985 and ACS polym. prop., 161-163 (1985) have an amide bond at the bonding part between aromatic polyester segment and polyorganosiloxane segment. This type of aromatic polyester-polyorganosiloxane block copolymers are disadvantageous in that they decompose at high temperatures without fusion and therefore they are unmoldable.

As above, no aromatic polyester-polyorganosiloxane block copolymer having high cold resistance and heat resistance and excellent in hydrolysis resistance and mold-ability has ever been obtained.

SUMMARY OF THE INVENTION

It is the object of the present invention to provide an aromatic polyester-polyorganosiloxane block copolymer having high cold resistance, heat resistance and impact resistance and excellent in weather resistance and mold-ability.

With the aim of achieving the above-mentioned object, the present inventors have conducted many studies to find that a copolymer prepared by copolymerizing an aromatic polyester and a terminal diol type polyorganosiloxane so that the bonding part forms an ester linkage is excellent in hydrolysis resistance, weather resistance and mold-ability in addition to its excellent heat resistance, cold resistance and impact resistance. Based on this finding, the present invention was accomplished.

DETAILED DESCRIPTION OF PREFERRED EMBODIMENTS

The present invention provides an aromatic polyester-polyorganosiloxane block copolymer comprising a polyester segment constituted mainly of:

(a) an aromatic polyester constituted of an aromatic dicarboxylic acid and a dihydric phenol, a lower aliphatic diol or an alicyclic diol, (b) an aromatic polyester constituted of an aromatic hydroxycarboxylic acid, or (c) a copolymer constituted of (a) and (b), and a polyorganosiloxane segment having a recurring unit represented by the following formula:

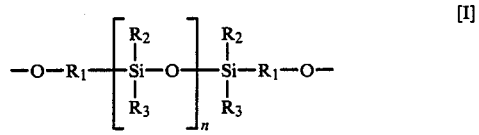

(in this formula, R represents a lower alkylene group or a lower alkylene ether group; $R_2$ and $R_3$ independently represents a methyl group or a phenyl group; and n represents an integer not smaller than 10), wherein the bonding part between the polyester segment and said polyorganosiloxane segment is an ester linkage formed by a condensation of the terminal carboxyl group of said polyester segment and the terminal hydroxyl group of said polyorganosiloxane segment.

In the invention, the polyester segment is constituted mainly of:

(a) an aromatic polyester constituted of an aromatic dicarboxylic acid and a dihydric phenol, a lower aliphatic diol or an alicyclic diol, (b) an aromatic polyester constituted of an aromatic hydroxycarboxylic acid, or (c) a copolymer constituted of (a) and (b).

The aromatic dicarboxylic acid used in the invention is represented by the following formula:

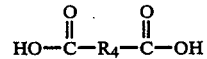

wherein $R_4$ represents a substituted or unsubstituted phenylene group, a group represented by the following

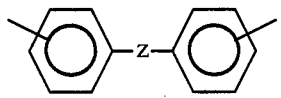

(in this formula, Z represents a direct linkage, —CH₂— or

) or a naphthylene group. As the substituent on said phenylene group, chlorine, bromine, methyl group and the like can be referred to, for example. Said substituted phenylene group may be substituted by 1 to 4 substituents.

Examples of said aromatic dicarboxylic acid include terephthalic acid, isophthalic acid, diphenyl-m,m'-dicarboxylic acid, diphenyl-p,p'-dicarboxylic acid, diphenylmethane-m,m'-dicarboxylic acid, diphenylmethane-p,p'-dicarboxylic acid, benzophenone-4,4'-dicarboxylic acid, naphthalenedicarboxylic acid and the like. These aromatic dicarboxylic acids may be used either alone or in mixture of two or more members. Among them, terephthalic acid and/or isophthalic acid are particularly preferable. It is also allowable to mix a small amount of aliphatic dicarboxylic acid such as adipic acid, sebacic acid and the like into the aromatic dicarboxylic acid.

Examples of said dihydric phenol include hydroquinone, resorcinol dihydroxynaphthalene, biphenol (biphenyldiol), 1,8-dihydroxyanthraquinone and the like, as well as the dihydric phenols represented by the following formula:

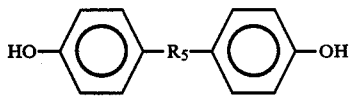

(R₅ represents oxygen atom, sulfur atom,

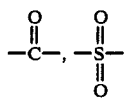

or optionally halogen-substituted alkylene group having 5 or less carbon atoms) such as 2,2-bis(4-hydroxyphenyl)propane (Bisphenol A), 4,4'-dihydroxydiphenyl sulfone, 4,4'-dihydroxydiphenyl ether, 4,4'-diphenyl sulfide, 4,4'-dihydroxydiphenyl ketone, 4,4'-dihydroxydiphenylmethane, 1,1-bis(4-hydroxyphenyl)-ethane, 1,1-bis(4-hydroxyphenyl)-butane, 1,1-bis(4-hydroxyphenyl)-2,2,2-trichloroethane and the like. These dihydric phenols may be used either alone or in mixture of two or more members.

As the lower aliphatic diol, alkylenediols having 2 to 6 carbon atoms can be used. Examples of said lower aliphatic diol include ethylene glycol, propylene glycol, 1,4-butanediol, 1,5-pentanediol, 1,6-hexanediol and the like. As the alicyclic diol, cyclohexanediol, cyclohexanedimethanol and the like can be used. These compounds may be used either alone or in mixture of two or more members. Among them, ethylene glycol and/or 1,4-butanediol and/or cyclohexanedimethanol are preferably used.

The aromatic hydroxycarboxylic acids usable in the invention are represented by the following formula:

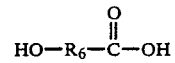

wherein R₆ is a phenylene group, a group represented by the following formula:

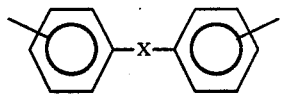

(X represents a direct linkage or an alkylene group having 5 or less carbon atoms) or a naphthylene group.

Examples of said aromatic hydroxycarboxylic acid include m-hydroxybenzoic acid, p-hydroxybenzoic acid, 1-hydroxy-6-naphthoic acid, 2-(4'-hydroxyphenyl)-2-(4'-carboxyphenyl)-propane, 4-hydroxyphenyl-4-carboxyphenyl ether, and the like. These aromatic hydroxycarboxylic acids may be used either alone or in mixture of two or more members.

Preferable examples of the polyester segment include an aromatic polyester constituted of terephthalic acid and 1,4-butanediol, an aromatic polyester constituted of terephthalic acid/isophthalic acid mixture and 2,2-bis(4-hydroxyphenyl)-propane, a copolymer of p-hydroxybenzoic acid and 6-hydroxy-2-naphtoic acid a copolymer of p-hydroxybenzoic acid, 2,6-naphthalenedicarbxylic acid and 2,6-naphthalenediol, and a copolymer of p-hydroxybenzoic acid, 2,6-naphthalenedicarboxylic acid, resorcinol and isophthalic acid.

The aromatic polyester used as the polyester segment may also be a polyester exhibiting a behavior of liquid crystal.

Next, the polyorganosiloxane segment will be explained.

In the invention, the polyorganosiloxane segment must be linked to the polyester segment through an Si-C bond, and any Si—O—C bond must not exist at the bonding part.

In the invention, the polyorganosiloxane segment has a recurring unit represented by the following formula:

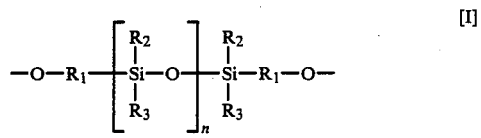

[I]

wherein R₁, R₂, R₃ and n are as defined above.

The lower alkylene groups which can be used as R₁ of the above-mentioned formula include straight chain alkylene groups having 2 to 6 carbon atoms such as ethylene, trimethylene, tetramethylene, pentamethylene, hexamethylene and the like and branched chain alkylene groups such as 1,2-butylene, 1,3-butylene, 2,3-butylene, 1,1- or 2,2-dimethyletylene and the like.

As said lower alkylene ether group the followings can be referred to:

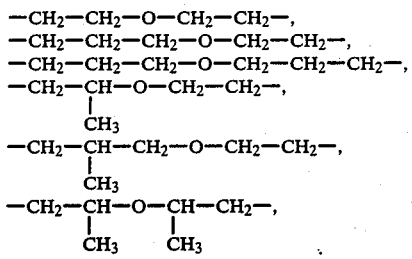

among which —CH₂—CH₂—CH₂—O—CH₂—CH₂—CH₂— and —(—CH₂—)₃—O—(—CH₂—)₂— are preferable.

In the block copolymer of the invention, the composition ratio of polyester segment to polyorganosiloxane segment is preferably in the range of 90:10 to 10:90, by weight. If the composition ratio is out of the above-mentioned range, the copolymer cannot exhibit its original performances as a block copolymer. That is to say, the characteristic features of polyester and polyorganosiloxane cannot be exhibited. If the proportion of polyester segment is too high, the polymer is close to a resin. If proportion of polyorganosiloxane is too high, the polymer is close to an elastomer.

The aromatic polyester-polyorganosiloxane block copolymer of the invention preferably has a number average molecular weight of 10,000 or higher, and more preferably 15,000 or higher. If its number average molecular weight is smaller than above, mechanical strength of polymer is not good.

The aromatic polyester-polyorganosiloxane block copolymer of the invention is characterized in that the bonding part between the polyester segment and the polyorganosiloxane segment is an ester linkage formed between the terminal carboxylic acid or polyester segment and the terminal hydroxyl group of polyorganosiloxane segment. If this bonding part is other than the ester linkage, mold-ability of the aromatic polyester-polyorganosiloxane block copolymer is not good.

The aromatic polyester-polyorganosiloxane block copolymer of the invention can be produced under the reaction conditions conventionally adopted in the production of polyesters. For example, it can be produced according to the following methods:

(1) a method which comprises reacting an aromatic polyester oligomer having terminal carboxyl group with a terminal diol type polyorganosiloxane represented by the following formula:

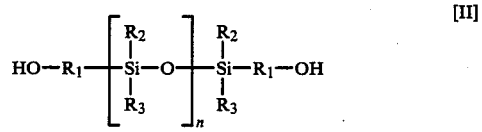

(R₁, R₂, R₃ and n are as defined above) such as polydimethylsiloxane, polydiphenylsiloxane, polymethylphenylsiloxane, poly(dimethylsiloxane-diphenylsiloxane) and the like, preferably polydimethylsiloxane, in the presence of a catalyst for esterification;

(2) a method which comprises reacting an aromatic polyester with a terminal diol type polyorganosiloxane represented by the above-mentioned formula (II) in the presence of a catalyst for ester interchange;

(3) a method which comprises reacting a terminal diol type polyorganosiloxane of formula (II) with an aromatic dicarboxylic acid dihalide and a dihydric phenol in a halogenated organic solvent such as chloroform or the like in the presence of a tertiary amine such as pyridine or the like as a dehydrochlorinating agent, at a temperature of 50° C. or below;

(4) a method which comprises melt-condensing a monomer constituting an aromatic polyester and a terminal diol type polyorganosiloxane of formula (II) in the presence of a catalyst for ester interchange; etc. Any of these methods may be adopted in the invention.

Said terminal diol type polyorganosiloxanes such as polydimethylsiloxane can be produced according to the known process mentioned in J. Polym. Sci., polymer physics Ed., 23, 2319 (1985).

To the block copolymer thus obtained, heat stabilizer, antioxidant, ultraviolet absorber, demolding agent, flame retardant, flame-retarding assistant and/or pigment, dye and the like may be added.

The block copolymer of the invention can be pelletized according to the conventional extrusion process and thereafter formed into the intended shape by the method of extrusion, injection molding, pressure molding, or the like.

Since the aromatic polyester-polyorganosiloxane block copolymer of the invention has the excellent quality of polyorganosiloxane in addition to the excellent quality of hitherto known polyester and is improved in the defective points of hitherto known polyester, it is usable as a thermoplastic resin or thermoplastic elastomer superior in weather resistance, heat resistance, cold resistance and impact resistance and in mechanical strengths to the hitherto known polyester. In addition, since the bonding part between the polyester segment and the polyorganosiloxane segment is the above-mentioned ester linkage, it is much improved in mold-ability as compared with hitherto known aromatic polyester-polyorganosiloxane block copolymers.

Next, the invention will be illustrated in more detail by way of the following examples.

(WORKING EXAMPLES)

Example 1

Into a reactor equipped with a stirrer, 0.97 kg of dimethyl terephthalate, 0.9 kg of 1,4-butanediol and 1.1 kg of terminal propanol-polydimethylsiloxane (number average molecular weight 1,800) represented by the following formula:

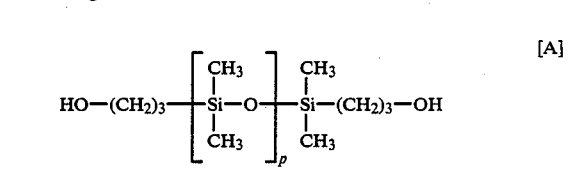

(p represents an integer not smaller than 10) were charged, and further 10 ml of 1% (by weight) butanolic solution of butyl titanate (Ti(OC₄H₉)₄) was added as a catalyst. The mixture was heated at a temperature of 150° C. to 250° C. for 4 hours with stirring in an atmosphere of nitrogen. Then, at 250° C., the pressure was gradually reduced to 0.5 mm Hg in 2 hours. Then, the mixture was stirred at 250° C. at a pressure of 0.5 mm Hg for 3 hours to complete the reaction. The resulting polymer weighed 2.1 kg, and its number average molecular weight was 31,000.

The polymer thus obtained was formed into test pieces having respective prescribed sizes by injection molding, and used for tensile test, Izod impact test, weathering test and hydrolysis test.

In the tensile test, tensile strength at break and tensile elongation at break and stress at 50% elongation were measured according to JIS K6301. In the Izod impact test, Izod impact strength of test piece having ⅛ inch notch was measured at 20° C. and −70° C. according to ASTM D256. In the weathering test, test piece was irradiated in sunshine weather-o-meter for 1,000 hours, and maintenances of tensile strength and elongation were calculated from the tensile strengths and elongations at break before and after the irradiation. In the hydrolysis test, test piece was boiled for 14 days, and maintenances of tensile strength and elongation were determined.

The results are listed in Table 1.

Example 2

A polymer was synthesized by repeating the procedure of Example 1, except that 1.358 kg of dimethyl terephthalate, 1.26 kg of 1,4-butanediol and 0.66 kg of the terminal propanol-polydimethylsiloxane (number average molecular weight 1,800) represented by formula (A) in Example 1 were used. The yield was 2.1 kg, and the number average molecular weight was 28,000. After polymerization, it was injection molded.

The product thus obtained was tested in the same manner under the same conditions as in Example 1 to obtain the results shown in Table 1.

Example 3

A polymer was synthesized by repeating the procedure of Example 1, except that 0.388 kg of dimethyl terephthalate, 0.36 kg of 1,4-butanediol and 1.76 kg of the terminal propanol-polydimethylsiloxane (number average molecular weight 5,800) represented by formula (A) in Example 1 were used. The yield was 2.1 kg, and the number average molecular weight was 40,000. After polymerization, it was injection molded.

The product thus obtained was tested in the same manner under the same conditions as in Example 1 to obtain the results shown in Table 1.

Comparative Example 1

A polymer was synthesized by repeating the procedure of Example 1, except that the terminal propanol-polydimethylsiloxane represented by formula (A) used in Example 1 was replaced with 0.9 kg of-both terminal butanoloxy-polydimethylsiloxane (number average molecular weight 1,600) represented by the following formula:

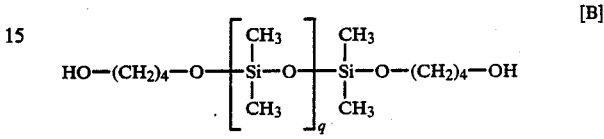

(q represents an integer not smaller than 10). The yield was 2.1 kg and the number average molecular weight was 30,000. After polymerization, it was injection molded.

The product thus obtained was tested in the same manner under the same conditions as in Example 1 to obtain the results shown in Table 1.

Comparative Example 2

A commercially available polybutylene terephthalate resin (Tafpet® PBT N1000, manufactured by Mitsubishi Rayon Co., Ltd.) was tested in the same manner under the same conditions as in Example 1 to obtain the results shown in Table 1.

Comparative Example 3

A commercially available polybutylene terephthalate-polyether resin (Pelprene® P70B, manufactured by Toyobo Co., Ltd.) was tested in the same manner under the same conditions as in Example 1 to obtain the results shown in Table 1.

TABLE 1

| | | Example 1 | Example 2 | Example 3 | Comparative Example 1 | Comparative Example 2 | Comparative Example 3 |
|---|---|---|---|---|---|---|---|
| Composition (Ratio by wt.) | Aromatic polyester/ Polyorgano siloxane | 50/ 50 | 70/ 30 | 20/ 80 | 50/ 50 | 100/ 0 | — |
| No. average molecular weight | | 31000 | 28000 | 40000 | 30000 | — | — |
| Tensile test | Strength at break (kg/cm²) | 260 | 350 | 200 | 250 | 500 | 280 |
| | Elongation at break (%) | 700 | 550 | 900 | 650 | 450 | 700 |
| | Stress at 50% elongation (kg/cm²) | 95 | 190 | 30 | 80 | 450 | 100 |
| Izod impact test | 20° C. (kg-cm/cm) | N.B. | N.B. | N.B. | N.B. | 3.5 | N.B. |
| | −70° C. (kg-cm/cm) | 65 | 40 | N.B. | 60 | 2 | 50 |
| Weathering test | Maintenance of strength (%) | 100 | 100 | 100 | 50 | 95 | 55 |
| | Maintenance of elongation (%) | 100 | 100 | 110 | 50 | 100 | 60 |
| Hydrolysis test | Maintenance of strength (%) | 90 | 85 | 95 | 30 | 45 | 85 |
| | Maintenance of elongation (%) | 100 | 120 | 110 | | | |

| | 40 | 60 | 110 |

*N.B. means that no breakage takes place.

Example 4

Into a reactor equipped with a stirrer were charged 0.5 kg of a terminal diol type polydimethylsiloxane (number average molecular weight 3,200) represented by the following formula:

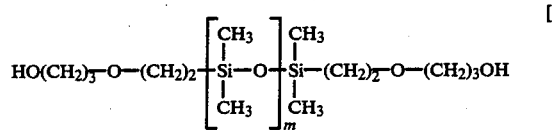

(m represents an integer not smaller than 10), 0.16 kg of terephthalic acid chloride and 0.16 kg of isophthalic acid chloride. By adding 6.0 kg of chloroform thereto, a uniform solution was prepared.

Subsequently, 0.32 kg of Bisphenol A was dissolved into a solvent mixture consisting of 2.0 kg of chloroform and 0.3 kg of pyridine to prepare a uniform solution, and the resulting solution was added to the above-mentioned solution which had previously been cooled to 0° C.

After stirring the resulting mixture for 7 to 8 hours, the reaction mixture was taken out, washed with dilute hydrochloric acid and water and then poured into methanol to recover 0.95 kg of a polymer.

The polymer thus obtained was formed into prescribed sizes of test pieces by injection molding in the usual way, with which a tensile test and a weathering test were carried out.

In the tensile test, tensile strength at break and tensile elongation at break were measured according to JIS K6301. In the weathering test, maintenances of strength and elongation were determined from the measurements of tensile strength and elongation at break before and after irradiation in sunshine weather-o-meter for 1,000 hours. The results are shown in Table 2.

Example 5

A polymer was synthesized in a yield of 0.95 kg by repeating the procedure of Example 4, except that 0.3 kg of the terminal diol type polydimethylsiloxane (number average molecular weight 3,200) represented by formula (C) in Example 4, 0.21 kg of terephthalic acid chloride, 0.21 kg of isophthalic acid chloride, 0.45 kg of Bisphenol A and 0.37 kg of pyridine were used.

The polymer thus obtained was tested in the same manner under the same conditions as in Example 4 to obtain the results shown in Table 2.

Example 6

A polymer was synthesized in a yield of 0.95 kg by repeating the procedure of Example 4, except that 0.1 kg of the terminal diol type polydimethylsiloxane (number average molecular weight 3,200) represented by formula (C) in Example 4, 0.27 kg of terephthalic acid chloride, 0.27 kg of isophthalic acid chloride, 0.59 kg of Bisphenol A and 0.49 kg of pyridine were used.

The polymer thus obtained was tested in the same manner under the same conditions as in Example 4 to obtain the results shown in Table 2.

Example 7

A polymer was synthesized in a yield of 0.95 kg by repeating the procedure of Example 4, except that 0.7 kg of the terminal diol type polydimethylsiloxane (number average molecular weight 3,200) represented by formula (C) in Example 4, 0.11 kg of terephthalic acid chloride, 0.11 kg of isophthalic acid chloride, 0.19 kg of Bisphenol A and 0.16 kg of pyridine were used.

The polymer thus obtained was tested in the same manner under the same conditions as in Example 4 to obtain the results shown in Table 2.

Example 8

A polymer was synthesized in a yield of 0.95 kg by repeating the procedure of Example 4, except that 0.9 kg of the both terminal diol type polydimethylsiloxane (number average molecular weight 3,200) represented by formula (C) in Example 4, 0.06 kg of terephthalic acid chloride, 0.06 kg of isophthalic acid chloride, 0.07 kg of Bisphenol A and 0.06 kg of pyridine were used.

The polymer thus obtained was tested in the same manner under the same conditions as in Example 4 to obtain the results shown in Table 2.

Example 9

A polymer was synthesized in a yield of 0.95 kg by repeating the procedure of Example 4, except that 0.5 kg of the both terminal diol type polydimethylsiloxane (number average molecular weight 1,800) represented by formula (C) in Example 4, 0.17 kg of terephthalic acid chloride, 0.17 kg of isophthalic acid chloride, 0.32 kg of Bisphenol A and 0.3 kg of pyridine were used.

The polymer thus obtained was tested in the same manner under the same conditions as in Example 4 to obtain the results shown in Table 2.

Example 10

A polymer was synthesized in a yield of 0.95 kg by repeating the procedure of Example 4, except that 0.5 kg of the terminal diol type polydimethylsiloxane (number average molecular weight 5,600) represented by formula (C) in Example 4, 0.15 kg of terephthalic acid chloride, 0.15 kg of isophthalic acid chloride, 0.32 kg of Bisphenol A and 0.3 kg of pyridine were used.

The polymer thus obtained were tested in the same manner under the same conditions as in Example 4 to obtain the results shown in Table 2.

Example 11

Into a reactor equipped with a stirrer were charged 0.1 kg of the terminal diol type polydimethylsiloxane (number average molecular weight 3,200) represented by formula (C) in Example 4, 0.034 kg of p-acetoxybenzoic acid, 0.032 kg of 1-acetoxy-6-naphthoic acid and 0.006 kg of terephthalic acid. Further, 50 ppm of tetrabutyl titanate was added thereto as a catalyst.

In an atmosphere of nitrogen, the mixture was heated at 230° C. for 3 hours, after which the temperature was elevated to 300° C. and the pressure was reduced to 15 mm Hg in 30 minutes. After heating the mixture at 300° C./15 mm Hg for one hour, the pressure was reduced to 0.5 mm Hg and heating was continued for an additional one hour. Then, the product was taken out to obtain a highly viscous polymer.

The polymer thus obtained was tested in the same manner under the same conditions as in Example 4 to obtain the results shown in Table 2.

Example 12

A highly viscous polymer was synthesized by repeating the procedure of Example 11, except that 0.1 kg of the terminal diol type polydimethylsiloxane (number average molecular weight 3,200) represented by formula (C) in Example 4, 0.033 kg of p-acetoxybenzoic acid, 0.042 kg of 2,6-naphthalene-dicarboxylic acid, 0.049 kg of 2,6-diacetoxynaphthalene and 0.006 kg of terephthalic acid were used.

The polymer thus obtained was tested in the same manner under the same conditions as in Example 4 to obtain the results shown in Table 2.

Example 13

A highly viscous polymer was synthesized by repeating the procedure of Example 11, except that 0.1 kg of the both terminal diol type polydimethylsiloxane (number average molecular weight 3,200) represented by formula (C) in Example 4, 0.033 kg of p-acetoxybenzoic acid, 0.042 kg 1 of 2,6-naphthalene-dicarboxylic acid, 0.039 kg of resorcinol diacetate and 0.006 kg of isophthalic acid were used.

The polymer thus obtained were tested in the same manner under the same conditions as in Example 4 to obtain the results shown in Table 2.

Comparative Example 4

In a reactor equipped with a stirrer and a cooler, 0.15 kg of terephthalic acid chloride, 0.15 kg of isophthalic acid chloride, 0.32 kg of Bisphenol A, 3.0 kg of chloroform and 0.25 kg of pyridine were heated under reflux for 4 to 5 hours.

The reaction mixture was taken out, several times washed with dilute hydrochloric acid and water and poured into methanol to obtain 0.42 kg of a terminal Bisphenol A type aromatic polyester having a number average molecular weight of 6,000.

Then, 0.42 kg of this terminal Bisphenol A type aromatic polyester, 0.38 kg of a terminal dimethylamino-polydimethylsiloxane (number average molecular weight 5,400) represented by the following formula:

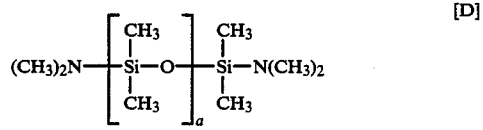

[D]

(a represents an integer not smaller than 10) and 5.5 kg of chlorobenzene were charged into a reactor equipped with a stirrer and a cooler and heated under reflux for 12 hours, after which the product was reprecipitated with methanol to obtain 0.75 kg of a polymer.

The polymer thus obtained was tested in the same manner under the same conditions as in Example 4 to obtain the results shown in Table 2.

Comparative Example 5

A uniform solution was prepared by adding 0.32 kg of Bisphenol A to an alkaline aqueous solution prepared by dissolving 0.14 kg of sodium hydroxide into 1.5 kg of water. Thereto was added a uniform solution prepared by dissolving 0.5 kg of a terminal aminopropyl-polydimethylsiloxane (number average molecular weight 4,500) represented by the following formula:

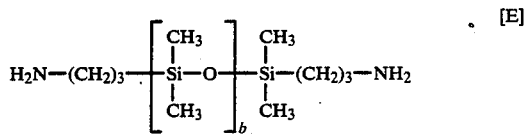

[E]

(b represents an integer not smaller than 10), 0.15 kg of terephthalic acid chloride and 0.15 kg of isophthalic acid chloride into 1.5 kg of methylene chloride. Further, 2.0 g of tetraethylammonium chloride was added as a catalyst. The resulting mixture was vigorously stirred at room temperature for 2 to 3 hours.

The organic layer was several times washed with dilute hydrochloric acid and water, and the product was reprecipitated with methanol to obtain 0.95 kg of a polymer.

The polymer thus obtained did not melt even at 350° C., so that it was unmoldable.

Comparative Example 6

A commercially available polycarbonate-polydimethylsiloxane block copolymer (LR-3320, manufactured by General Electric) was tested in the same manner under the same conditions as in Example 4 to obtain the results shown in Table 2.

Comparative Example 7

A commercially available hydrogenated styrene-butadiene block copolymer (Kraton ® G 1652, manufactured by Shell Chemical) was tested in the same manner under the same conditions as in Example 4 to obtain the results shown in Table 2.

Example 14

Into a reactor equipped with a stirrer were charged 2.54 kg of a terminal diol type polydimethylsiloxane (number average molecular weight 1,800) represented by formula (A) in Example 1, 1.94 g of dimethyl terephthalate and 2.68 kg of cyclohexanedimethanol. Further, 150 ml of 1% (by weight) butanolic solution of tetra butyl titanate (Ti(OC$_4$H$_9$)$_4$) was added thereto as a catalyst. In an atmosphere of nitrogen, the mixture was heated at a temperature of 200° C. to 310° C. for 4 hours with stirring. Then, the pressure was gradually reduced to 0.5 mm Hg in 2 hours, at 310° C. Then, the mixture was stirred at 310° C./0.5 mm Hg for 2 hours to complete the reaction. The number average molecular weight was 35,000. The product thus obtained was tested in the same manner as in Example 4 to obtain the results shown in Table 2.

TABLE 2

| | Composition PE/PDMS* Ratio by wt. (%) | Number average molecular weight | Tensile test | | Weathering test | |
|---|---|---|---|---|---|---|
| | | | Strength at break (kg/cm²) | Elongation at break (%) | Maintenance of strength (%) | Maintenance of elongation (%) |
| Example 4 | 50/50 | 56,000 | 370 | 500 | 97 | 110 |
| Example 5 | 70/30 | 52,000 | 420 | 300 | 99 | 100 |
| Example 6 | 90/10 | 70,000 | 610 | 120 | 98 | 98 |
| Example 7 | 30/70 | 55,000 | 290 | 890 | 96 | 100 |
| Example 8 | 10/90 | 60,000 | 180 | 1000 | 96 | 105 |
| Example 9 | 50/50 | 53,000 | 380 | 420 | 97 | 110 |
| Example 10 | 50/50 | 55,000 | 400 | 630 | 95 | 115 |
| Example 11 | 50/50 | 60,000 | 450 | 520 | 97 | 100 |
| Example 12 | 50/50 | 62,000 | 440 | 550 | 96 | 105 |
| Example 13 | 50/50 | 59,000 | 450 | 530 | 98 | 100 |
| Comparative Example 4 | 50/50 | 58,000 | 350 | 400 | 30 | 15 |
| Comparative Example 6 | — | — | 150 | 400 | 67 | 15 |
| Comparative Example 7 | — | — | 300 | 500 | 18 | 2 |
| Example 14 | 50/50 | 35,000 | 280 | 650 | 98 | 105 |

*PE/PDMS = Polyester/Polydimethylsiloxane

The aromatic polyester-polyorganosiloxane block copolymer of the invention is excellent in weather resistance, heat resistance, cold resistance and impact resistance, and has high mechanical strengths and an excellent mold-ability. Accordingly, it is useful as a thermoplastic resin or thermoplastic elastomer resistant to more severe conditions and applicable to more extensive uses than ever.

What is claimed is:

1. An aromatic polyester-polyorganosiloxane block copolymer comprising a polyester segment consisting essentially of:
   (a) an aromatic polyester of an aromatic dicarboxylic acid, or mixtures thereof, and a dihydric phenol, a lower aliphatic diol, an alicyclic diol, or mixtures thereof,
   (b) an aromatic polyester of an aromatic hydroxycarboxylic acid or mixtures thereof, or
   (c) a copolymer of (a) and (b), and a polyorganosiloxane segment having a recurring unit represented by the following formula:

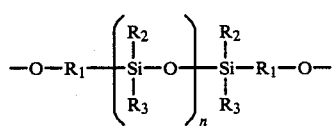

in which $R_1$ represents a lower alkylene group or a lower alkylene ether group; $R_2$ and $R_3$ independently represent a methyl group or a phenyl group; and n represents an integer not smaller than 10, in which bonding between the polyester segment and the polyorganosiloxane segment is an ester linkage formed by a condensation reaction between the terminal carboxyl group of the polyester segment and the terminal hydroxyl group of the polyorganosiloxane segment.

2. An aromatic polyester-polyorganosiloxane block copolymer according to claim 1, wherein the number average molecular weight of said block copolymer is 10,000 or higher.

3. An aromatic polyester-polyorganosiloxane block copolymer according to claim 1, wherein the composition ratio of aromatic polyester to polyorganosiloxane is in the range of 90:10 to 10:90 by weight.

4. An aromatic polyester-polyorganosiloxane block copolymer according to claim 1, wherein the aromatic dicarboxylic acid of the aromatic polyester is represented by the following formula 2 and the dihydric phenol is represented by the following formula 3: formula 2:

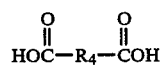

wherein $R_4$ represents a substituted or unsubstituted phenylene group formula 3:

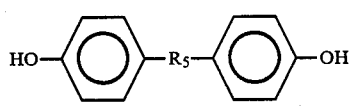

wherein $R_5$ represents oxygen atom, sulfur atom,

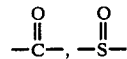

an alkylene group having 5 or less carbon atoms, or a halogen-substituted alkylene group having 5 or less carbon atoms.

5. An aromatic polyester-polyorganosiloxane block copolymer according to claim 4, wherein the aromatic dicarboxylic acid of the aromatic polyester is terephthalic acid and/or isophthalic acid, or mixtures thereof, and the dihydric phenol is 2,2-bis(4-hydroxyphenyl)-propane.

6. An aromatic polyester-polyorganosiloxane block copolymer according to claim 1, wherein the aromatic dicarboxylic acid of the aromatic polyester is represented by the formula

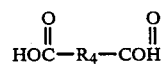

wherein $R_4$ represents a substituted or unsubstituted phenylene group, the lower aliphatic diol is an alkylene diol having 2 to 6 carbon atoms, and the alicyclic diol is cyclohexanediol or cyclohexanedimethanol.

7. An aromatic polyester-polyorganosiloxane block copolymer according to claim 6, wherein the aromatic dicarboxylic acid of the aromatic polyester is terephthalic acid, isophthalic acid, or mixtures thereof, and the lower aliphatic diol is ethylene glycol, 1,4-butanediol, cyclohexanedimethanol, or mixtures thereof.

8. An aromatic polyester-polyorganosiloxane block copolymer according to claim 1, wherein the aromatic polyester exhibits liquid crystal behavior.

9. An aromatic polyester-polyorganosiloxane block copolymer according to claim 8, wherein said aromatic polyester is a copolymer of p-hydroxybenzoic acid and 6-hydroxy-2-naphthoic acid.

10. An aromatic polyester-polyorganosiloxane block copolymer according to claim 8, wherein said aromatic polyester is a copolymer of p-hydroxybenzoic acid, 2,6-naphthalene-dicarboxylic acid and 2,6-naphthalenediol.

11. An aromatic polyester-polyorganosiloxane block copolymer according to claim 8, wherein said aromatic polyester is a copolymer of p-hydroxybenzoic acid, 2,6-naphthalene-dicarboxylic acid, isophthalic acid and resorcinol.

* * * * *